United States Patent
Robichaux et al.

(10) Patent No.: US 6,434,466 B1
(45) Date of Patent: Aug. 13, 2002

(54) SYSTEM AND METHOD FOR DETERMINING ENGINE TORQUE FOR CONTROLLING A POWERTRAIN

(75) Inventors: Jerry Dean Robichaux, Riverview; Timothy Joseph Clark, Livonia; Tobias John Pallett, Ypsilanti, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/306,307

(22) Filed: May 6, 1999

(51) Int. Cl.$^7$ .................... G06F 17/00; G06F 19/00; B60K 41/04
(52) U.S. Cl. ................ 701/54; 701/53; 701/60; 701/61; 477/107; 477/110; 477/111
(58) Field of Search .................... 701/53, 54, 60, 701/61; 477/54, 107, 109, 110, 111

(56) References Cited

U.S. PATENT DOCUMENTS

| | | | |
|---|---|---|---|
| 4,353,272 A | 10/1982 | Schneider et al. | 477/43 |
| 4,697,561 A | 10/1987 | Citron | 123/339.14 |
| 4,730,708 A | 3/1988 | Hamano et al. | 477/114 |
| 4,739,483 A | 4/1988 | Ina et al. | 701/58 |
| 4,819,596 A | 4/1989 | Yasuoka et al. | 477/111 |

(List continued on next page.)

FOREIGN PATENT DOCUMENTS

| | | |
|---|---|---|
| AU | B 66831/81 | 9/1982 |
| EP | 0 206 091 B1 | 12/1986 |
| EP | 0 340 764 | 11/1989 |
| EP | 0 408 767 B1 | 1/1991 |
| EP | 0 413 031 B1 | 2/1991 |

(List continued on next page.)

OTHER PUBLICATIONS

"Hierarchial Control Strategy of Powertrain Functions", by H.M. Streib et al, 24. FISITA Congress, London Jun. 7–11, 1992, pp. 1–11.
"Torque–Based System Structure of the Electronic Engine Management System (ME7) as a New Base for Drive Train Systems", by J. Gerhardt et al, 6. Aachener Kolloquim Fahrzeug– und Motorentechik '97, Oct. 22, 1997, pp. 817–849.

Primary Examiner—Jacques H. Louis-Jacques
Assistant Examiner—Brian J Broadhead
(74) Attorney, Agent, or Firm—Allan J. Lippa; John D. Russell

(57) ABSTRACT

A system and method for controlling a powertrain including an automatic transmission include determining a desired wheel torque, determining engine speed, determining turbine speed, determining a selected gear and associated selected gear ratio, determining a transmission spin loss based on a first function of the turbine speed and the selected gear, determining a transmission torque proportional loss based on a second function of the turbine speed and the selected gear, determining a desired engine torque based on the transmission spin loss, the transmission torque proportional loss, and the selected gear ratio, and controlling the powertrain using the desired engine torque such that actual wheel torque approaches the desired wheel torque. A transmission pump loss may also be determined based on line pressure and engine speed. An alternative strategy determines engine torque using a power-based calculation if the vehicle speed is above a predetermined threshold, and a gear ratio based calculation if the vehicle speed does not exceed the predetermined threshold. Strategies for determination of the desired or requested engine torque during a gear shift or ratio change include a first strategy which determines an engine torque corresponding to the current gear ratio and the target gear ratio with the desired engine torque being interpolated between the two values. Turbine speed may be determined by an appropriate sensor or estimated. Alternatively, torque converter slip may be utilized with the slip value held constant for a predetermined time during the ratio change.

24 Claims, 7 Drawing Sheets

U.S. PATENT DOCUMENTS

| | | | | |
|---|---|---|---|---|
| 4,844,202 A | * | 7/1989 | Maresko | 184/6.12 |
| 4,951,627 A | | 8/1990 | Watanabe et al. | 477/111 |
| 5,029,087 A | * | 7/1991 | Cowan et al. | 701/68 |
| 5,069,181 A | | 12/1991 | Togai et al. | 123/350 |
| 5,078,109 A | | 1/1992 | Yoshida et al. | 123/350 |
| 5,086,668 A | | 2/1992 | Fujiwara et al. | 477/161 |
| 5,109,732 A | | 5/1992 | Takizawa | 477/161 |
| 5,213,011 A | * | 5/1993 | Nobumoto et al. | 74/862 |
| 5,245,966 A | | 9/1993 | Zhang et al. | 123/339.19 |
| 5,304,102 A | | 4/1994 | Narita et al. | 475/125 |
| 5,325,740 A | | 7/1994 | Zhang et al. | 477/110 |
| 5,351,776 A | | 10/1994 | Keller et al. | 701/70 |
| 5,374,224 A | | 12/1994 | Huffmaster et al. | 477/181 |
| 5,377,562 A | * | 1/1995 | Kitagawa et al. | 477/110 |
| 5,385,516 A | * | 1/1995 | Grange et al. | 477/107 |
| 5,398,544 A | | 3/1995 | Lipinski et al. | 73/118.2 |
| 5,407,401 A | | 4/1995 | Bullmer et al. | 477/110 |
| 5,408,966 A | | 4/1995 | Lipinski et al. | 123/198 F |
| 5,408,974 A | | 4/1995 | Lipinski et al. | 123/481 |
| 5,431,139 A | | 7/1995 | Grutter et al. | 123/198 F |
| 5,437,253 A | | 8/1995 | Huffmaster et al. | 123/399 |
| 5,445,125 A | | 8/1995 | Allen | 123/399 |
| 5,460,580 A | * | 10/1995 | Streib | 477/110 |
| 5,462,501 A | | 10/1995 | Bullmer et al. | 477/155 |
| 5,484,351 A | * | 1/1996 | Zhang et al. | 477/113 |
| 5,501,644 A | | 3/1996 | Zhang | 477/97 |
| 5,503,129 A | | 4/1996 | Robichaux et al. | 123/481 |
| 5,520,159 A | | 5/1996 | Pao et al. | 123/568.27 |
| 5,568,795 A | | 10/1996 | Robichaux et al. | 123/198 F |
| 5,575,257 A | | 11/1996 | Lange et al. | 123/339.11 |
| 5,588,178 A | | 12/1996 | Liu | 15/330 |
| 5,603,672 A | | 2/1997 | Zhang | 477/110 |
| 5,605,131 A | | 2/1997 | Ohno et al. | 123/399 |
| 5,606,951 A | | 3/1997 | Southern et al. | 123/399 |
| 5,628,706 A | * | 5/1997 | Zhang | 477/166 |
| 5,680,763 A | | 10/1997 | Unland et al. | 60/602 |
| 5,692,471 A | | 12/1997 | Zhang | 123/350 |
| 5,720,693 A | * | 2/1998 | Mori | 477/107 |
| 5,743,083 A | | 4/1998 | Schnaibel et al. | 60/274 |
| 5,826,208 A | * | 10/1998 | Kuriowa et al. | 701/54 |
| 5,875,761 A | * | 3/1999 | Fujieda et al. | 123/399 |
| 5,890,509 A | * | 4/1999 | Becker et al. | 137/115.26 |
| 5,921,885 A | * | 7/1999 | Tabata et al. | 477/107 |
| 5,938,712 A | * | 8/1999 | Ibamoto et al. | 701/54 |
| 5,951,433 A | * | 9/1999 | Tsukamoto et al. | 475/281 |
| 5,967,942 A | * | 10/1999 | Yuasa et al. | 477/156 |
| 5,980,414 A | * | 11/1999 | Larkin | 475/211 |
| 6,052,640 A | * | 4/2000 | Wu | 701/67 |
| 6,065,446 A | * | 5/2000 | Engl et al. | 123/325 |
| 6,071,208 A | | 6/2000 | Koivunen | 475/275 |
| 6,132,336 A | * | 10/2000 | Adachi et al. | 477/169 |
| 6,154,702 A | * | 11/2000 | Fodor et al. | 701/71 |
| 6,155,954 A | * | 12/2000 | Itoyama et al. | 477/5 |
| 6,188,943 B1 | * | 2/2001 | Uchida et al. | 701/54 |
| 6,188,944 B1 | * | 2/2001 | Kolmanovsky et al. | 701/54 |
| 6,188,945 B1 | * | 2/2001 | Graf et al. | 701/58 |

FOREIGN PATENT DOCUMENTS

| | | |
|---|---|---|
| EP | 0 557 299 B1 | 10/1991 |
| EP | 0 749 524 B1 | 2/1995 |
| EP | 0 754 888 A2 | 1/1997 |
| GB | 2 154 763 A | 9/1985 |
| GB | 2 239 500 B | 7/1991 |
| GB | 2 239 683 A | 7/1991 |
| GB | 2 239 683 B | 7/1991 |
| GB | 2 312 970 A | 11/1997 |
| GB | 2318 105 A | 4/1998 |
| WO | WO 95/01502 | 1/1995 |

\* cited by examiner

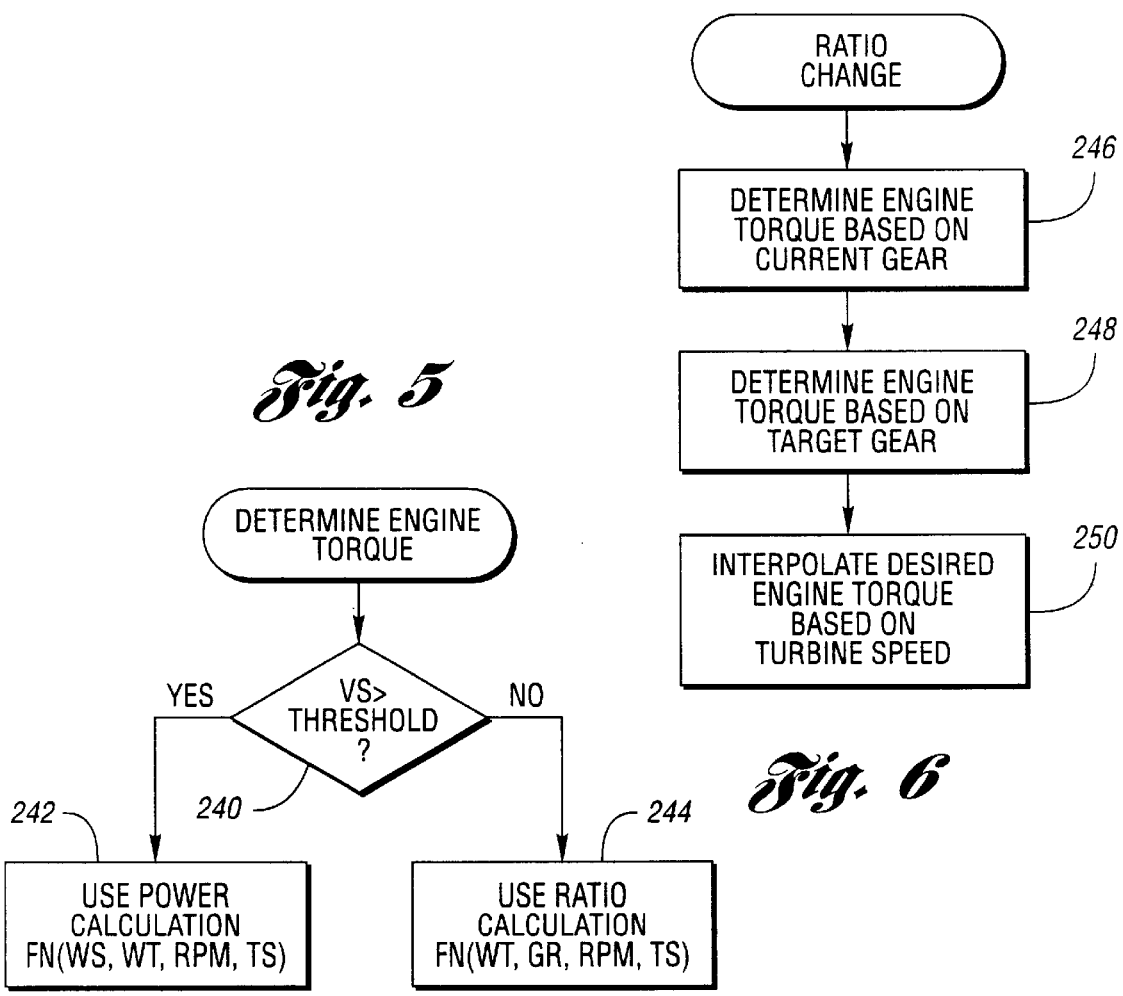
Fig. 5
Fig. 6
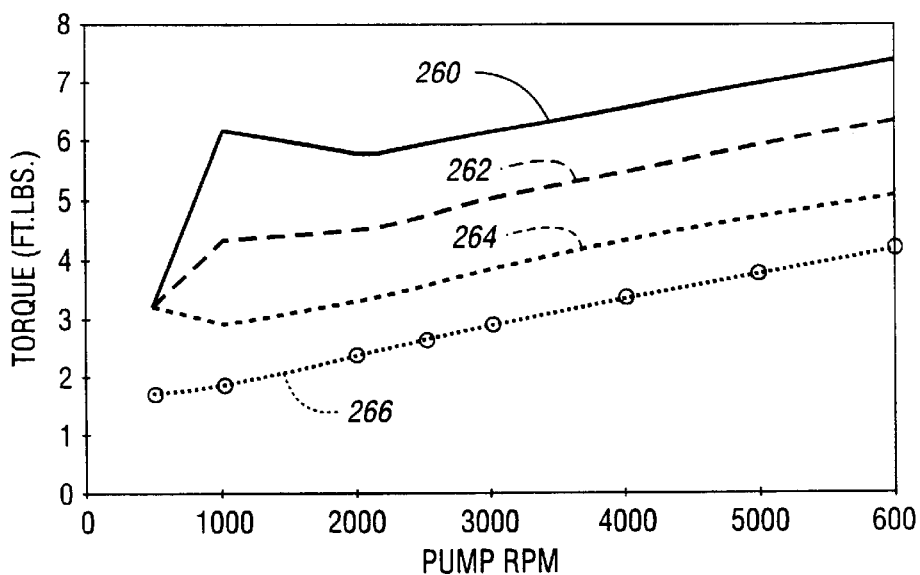
Fig. 8

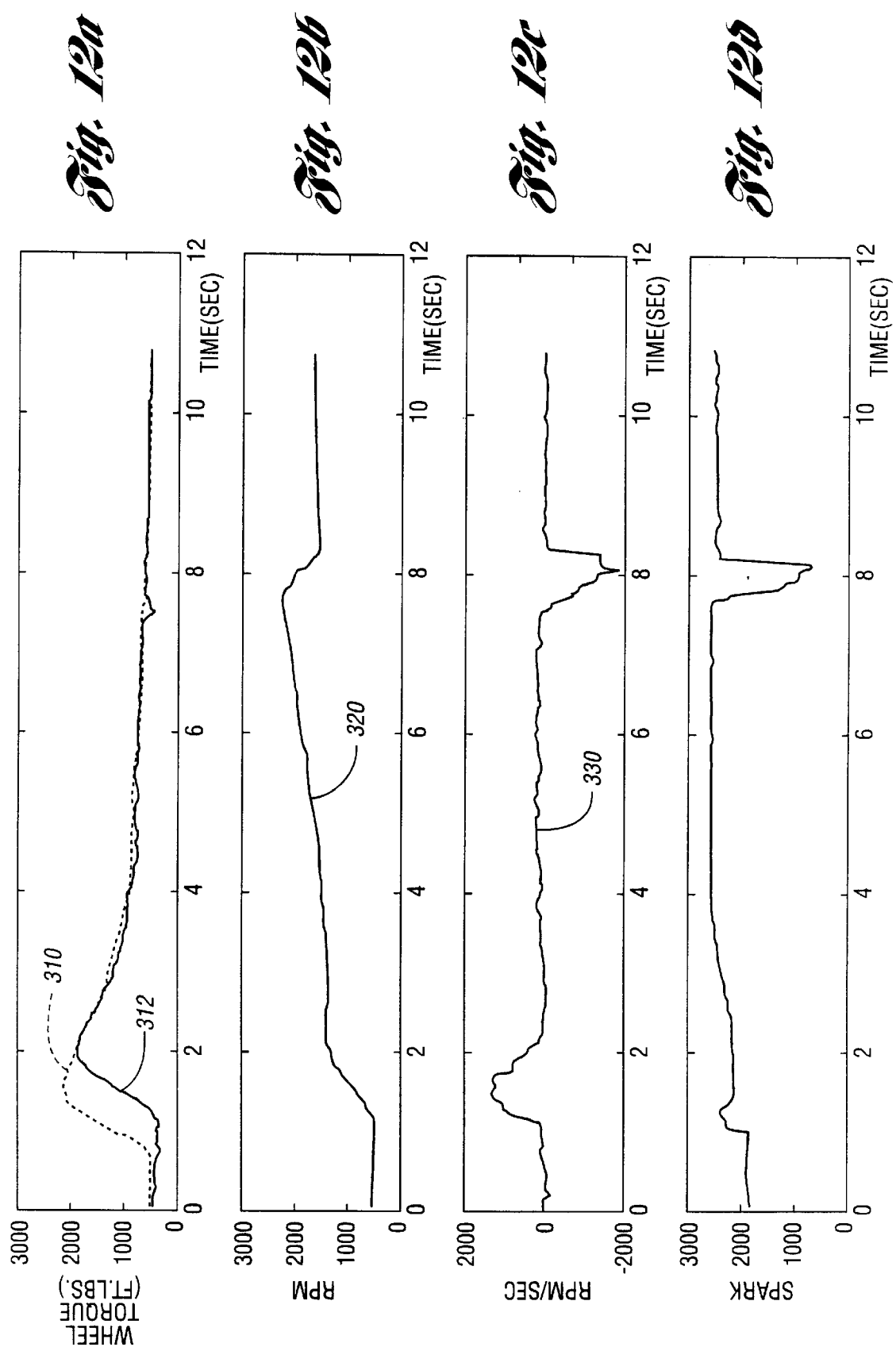

SYSTEM AND METHOD FOR DETERMINING ENGINE TORQUE FOR CONTROLLING A POWERTRAIN

TECHNICAL FIELD

The present invention is directed to a system and method for determining engine torque for use in controlling a powertrain.

BACKGROUND ART

Mechanical throttle control systems use airflow as the primary control parameter in controlling powertrain output. The airflow is controlled by a throttle valve in the intake which is mechanically linked to a throttle pedal. As such, many powertrain control parameters were traditionally based on, or indexed by, the throttle valve position.

Electronic airflow control systems, such as variable cam timing systems and electronic throttle control systems, replace the traditional mechanical throttle cable system with an "electronic linkage" provided by sensors and actuators in communication with an electronic controller. This increases the control authority of the electronic controller and allows the airflow to be controlled independently of the accelerator pedal position. As such, the throttle valve position is no longer necessarily indicative of the requested or desired powertrain output.

SUMMARY OF THE INVENTION

It is an object of the present invention to provide a system and method for determining engine torque for use in controlling a powertrain to achieve a desired powertrain output, such as engine torque, wheel torque, wheel power, or tractive effort.

Another object of the present invention is to provide a system and method for determining a desired engine torque during a ratio change of an automatic transmission.

In carrying out the above object and other objects, advantages, and features of the present invention, a system and method for controlling a vehicular powertrain preferably including an internal combustion engine and an automatic transmission include determining a desired wheel torque, determining engine speed, determining turbine speed, determining a selected gear and associated selected gear ratio, determining a transmission spin loss based on a first function of the turbine speed and the selected gear, determining a torque converter multiplication, determining a transmission torque proportional loss based on a second function of the turbine speed and the selected gear, determining a desired engine torque based on the transmission spin loss, the transmission torque proportional loss, the torque converter multiplication, and the selected gear ratio, and controlling the powertrain using the desired engine torque such that actual wheel torque approaches the desired wheel torque. A transmission pump loss may also be determined, based on line pressure and engine speed, and incorporated into the determination of desired engine torque.

An alternative strategy for determining desired engine torque uses a power-based calculation if the vehicle speed is above a predetermined threshold, and a gear, ratio based calculation if the vehicle speed does not exceed the predetermined threshold. Turbine speed (actual or estimated) or torque converter slip may be used in determining the desired engine torque according to the present invention.

Alternative strategies for determination of the desired or requested engine torque during a gear shift or ratio change are also provided. The first strategy determines engine torques corresponding to the current gear ratio and the target gear ratio. The desired engine torque is then interpolated between the torque values corresponding to the current gear ratio and the target gear ratio based on the turbine speed. Turbine speed is used to interpolate between the two values by comparing the actual or estimated turbine speed to the expected turbine speed for the current and target gears or gear ratios. Turbine speed may be determined by an appropriate sensor or estimated.

The second strategy utilizes a sample and hold technique to determine the desired engine torque during a ratio change. Upon initiation of a ratio change, the estimated value for the torque converter slip is held or stored for a predetermined time. This value is used to determine the desired engine torque based on one of the two alternative strategies described above.

The first strategy is preferred in that it is capable of integrating relatively complex expressions for the engine torque calculation, is not susceptible to delays in gear ratio determination, and the same calculation provides acceptable results over the entire vehicle speed range.

The present invention provides a number of other advantages over prior art control strategies. For example, the present invention provides a modular control structure which may be easily adapted to new engine technologies such as lean burn, variable cam timing, and direct injection. Electronic airflow control provides improved powertrain efficiencies and better control during various modes of operation including cruise control and traction assist.

The above advantages and other advantages, objects, and features of the present invention, will be readily apparent from the following detailed description of the best mode for carrying out the invention when taken in connection with the accompanying drawings.

BRIEF DESCRIPTION OF THE DRAWINGS

FIG. 5 is a flowchart illustrating an alternative strategy for determining desired engine torque according to the present invention;

FIG. 6 is a flowchart illustrating control logic for determining a desired engine torque during a ratio change according to the present invention;

FIG. 8 is a graph illustrating representative values of a transmission oil pump for use in determining desired engine torque according to the present invention;

FIGS. 12A–12D illustrate engine torque modulation during a ratio change based on a desired engine torque calculation according to the present invention.

BEST MODE(S) FOR CARRYING OUT THE INVENTION

Figure 1:
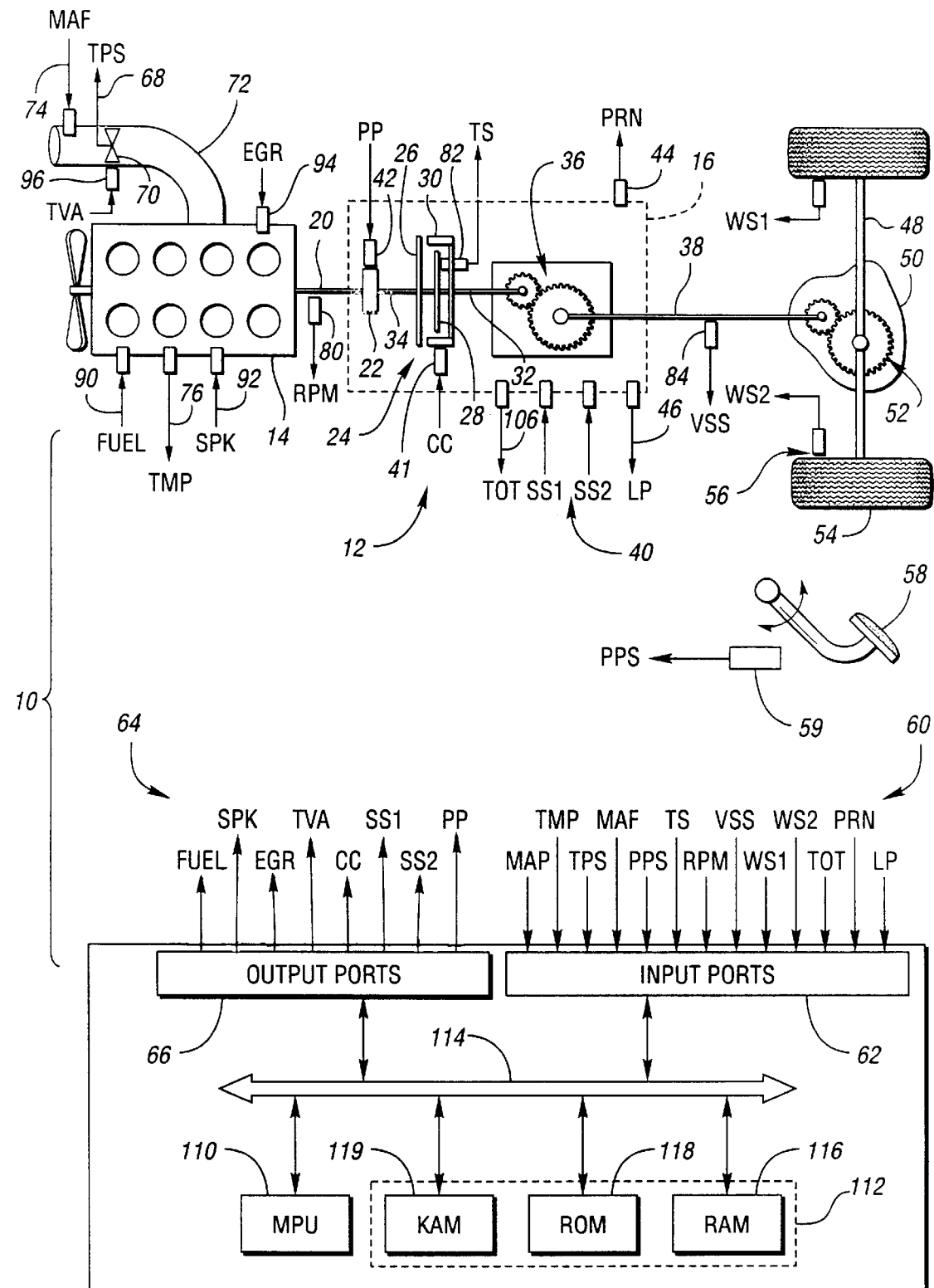
FIG. 1 is a block diagram illustrating a system and method for determining engine torque for use in controlling a powertrain according to the present invention.

FIG. 1 provides a block diagram illustrating operation of a system or method for determining desired engine torque based on wheel torque for use in controlling a powertrain according to the present invention.

System 10 includes a vehicular powertrain 12 having an internal combustion engine 14 coupled to an automatic transmission 16. Powertrain 12 may also include a controller 18 in communication with engine 14 and transmission 16 for providing various information and control functions. Engine 14 is connected to transmission 16 via crankshaft 20 which is connected to transmission pump 22 and/or torque converter 24. Preferably, torque converter 24 is a hydrodynamic torque converter including a pump or impeller 26 which is selectively fluidly coupled to a turbine 28. Torque converter 24 may also include a frictional converter clutch or bypass clutch 30 which provides a selective frictional coupling between turbine shaft 32 and input shaft 34.

Automatic transmission 16 includes a plurality of input-to-output ratios or gear ratios effected by various gears, indicated generally by reference numeral 36, and associated frictional elements such as clutches, bands, and the like, as well known in the art. Gears 36 provide selective reduction or multiplication ratios between turbine shaft 32 and output shaft 38. Automatic transmission 16 is preferably electronically controlled via one or more shift solenoids, indicated generally by reference numeral 40, and a converter clutch control (CC) 41 to select an appropriate gear ratio based on current operating conditions. Transmission 16 also preferably includes an actuator for controlling pump pressure (PP) 42 (or line pressure), in addition to a shift lever position sensor (PRN) 44 to provide an indication of the operator's selected gear or driving mode, such as drive, reverse, park, etc. A line pressure sensor (LP) 46 can be provided to facilitate closed loop feedback control of the hydraulic line pressure during shifting or ratio changing.

Depending upon the particular application, output shaft 38 may be coupled to one or more axles 48 via a final drive reduction or differential 50 which may include one or more gears, as indicated generally by reference numeral 52. Each axle 48 may include two or more wheels 54 having corresponding wheel speed sensors 56.

In addition to the sensors described above, powertrain 12 preferably includes a plurality of sensors, indicated generally by reference numeral 60, in communication with corresponding input ports 62 of controller 18 to sense or monitor the current operating and ambient conditions of powertrain 12. A plurality of actuators, indicated generally by reference numeral 64, communicate with controller 18 via output ports 66 to effect control of powertrain 12 in response to commands generated by controller 18.

The sensors preferably include a throttle valve position sensor (TPS) 68 which monitors the position of throttle valve 70 which is disposed within intake 72. A mass air flow sensor (MAF) 74 provides an indication of the air mass flowing through intake 72. A temperature sensor (TMP) 76 provides an indication of the engine temperature which may include engine coolant temperature or engine oil temperature, for example.

As also illustrated in FIG. 1, an engine speed sensor (RPM) 80 monitors rotational speed of crankshaft 20. Similarly, a turbine speed sensor 82 monitors the rotational speed of the turbine 28 of torque converter 24. Another rotational speed sensor, vehicle speed sensor (VSS) 84, provides an indication of the speed of output shaft 38 which may be used to determine the vehicle speed based on the ratio of differential 50 and the size of wheels 54. Of course, wheel speed sensors (WS1 and WS2) 56 may be used to provide an indication of the vehicle speed as well.

Depending upon the particular application requirements, various sensors may be omitted or alternative sensors provided which generate signals indicative of related sensed parameters. Values corresponding to ambient or operating conditions may be inferred or calculated using one or more of the sensed parameters without departing from the spirit or scope of the present invention.

An accelerator pedal 58 is manipulated by the driver to control the output of powertrain 12. A pedal position sensor 59 provides an indication of the position of accelerator pedal 58, preferably in the form of counts. In one embodiment, an increasing number of counts indicates a request for increased power output. Preferably, redundant position sensors are used with at least one position sensor having a negative slope such that a decreasing number of counts corresponds to a request for increased power output. A manifold absolute pressure (MAP) sensor, or equivalent, may be used to provide an indication of the current barometric pressure.

Actuators 64 are used to provide control signals or to effect movement of various devices in powertrain 12. Actuators 64 may include actuators for timing and metering fuel (FUEL) 90, controlling ignition angle or timing (SPK) 92, setting the amount of exhaust gas recirculation (EGR) 94, and adjusting the intake air using throttle valve 70 with an appropriate servomotor or actuator (TVA) 96. As described above, automatic transmission 16 may be selectively controlled by controlling transmission pump or line pressure using an appropriate actuator (PP) 42 in combination with shift solenoids (SS1 and SS2) 40 which are used to select an appropriate gear ratio, and a converter clutch actuator or solenoid (CC) 41 used to lock, unlock or control slip of the torque converter clutch 30. Also preferably, a temperature sensor 106 is provided to determine the transmission oil temperature (TOT).

Controller 18 is preferably a microprocessor-based controller which provides integrated control of engine 14 and transmission 16 of powertrain 12. Of course, the present invention may be implemented in a separate engine or transmission controller depending upon the particular application. Controller 18 includes a microprocessor 110 in communication with input ports 62, output ports 66, and computer readable media 112 via a data/control bus 114. Computer readable media 112 may include various types of volatile and nonvolatile memory such as random access memory (RAM) 116, read-only memory (ROM) 118, and keep-alive memory (KAM) 119. These "functional" descriptions of the various types of volatile and nonvolatile storage may be implemented by any of a number of known physical devices including but not limited to EPROMs, EEPROMs, PROMs, flash memory, and the like. Computer readable media 112 include stored data representing instructions executable by microprocessor 110 to implement the method for determining a desired engine torque based on a desired wheel torque according to the present invention.

Figure 2:
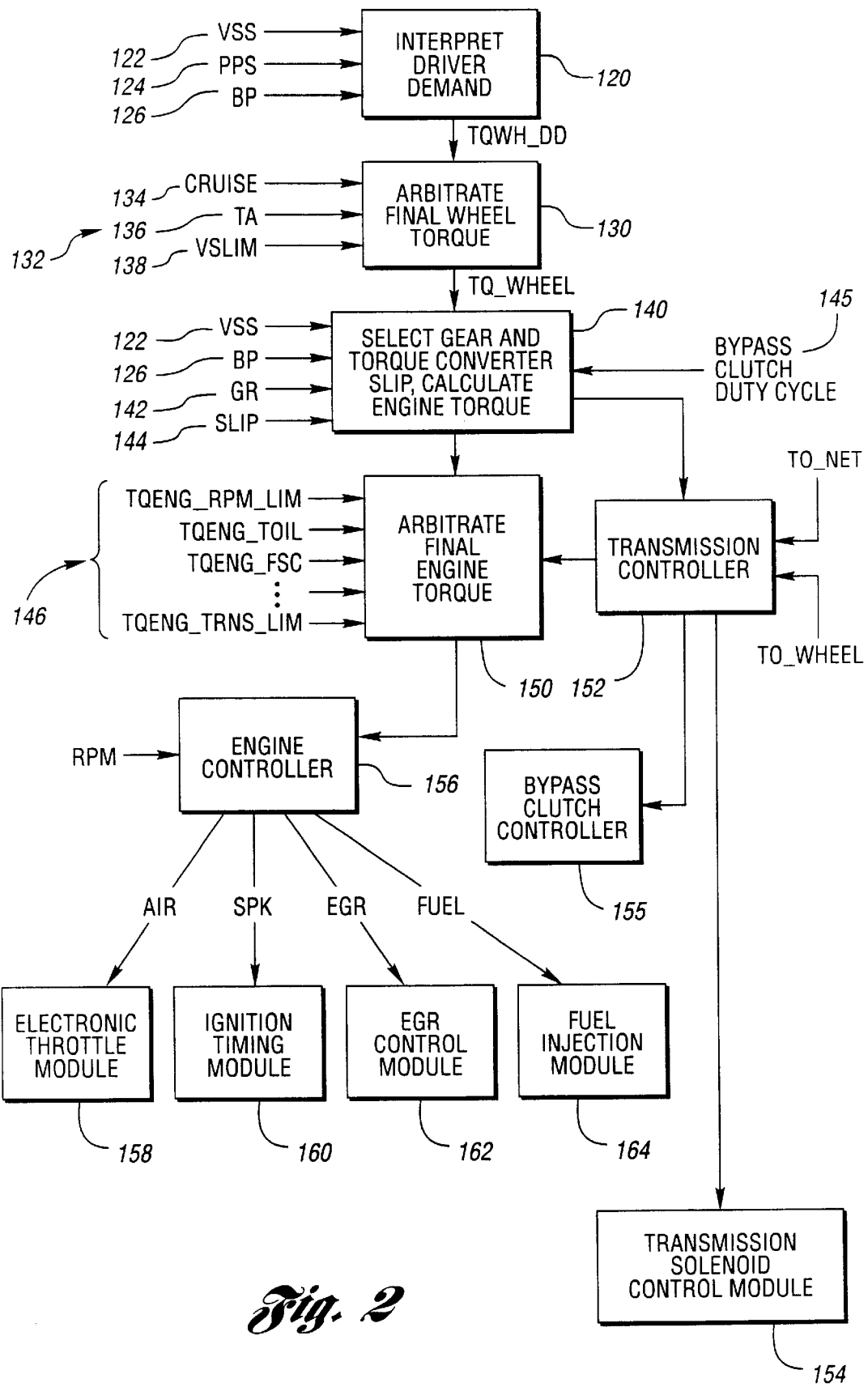
FIG. 2 is a block diagram illustrating an output torque based powertrain control strategy including determination of engine torque according to the present invention.

FIG. 2 provides a block diagram for a modular control architecture including determination of desired engine torque from desired wheel torque according to the present invention. A driver demand is interpreted as represented by block 120 based on the vehicle speed 122 accelerator pedal position 124 and barometric pressure 126. The driver demand wheel torque (TQWH_DD) is provided as an input to block 130 which arbitrates the final wheel torque among various other torque requesters, indicated generally by reference numeral 132. Such torque requesters may include, for example, a cruise control torque 134, a traction assist torque 136, and/or a vehicle speed limiting torque 138. Block 130 selects the appropriate torque depending upon the current operating conditions and provides this final wheel torque (TQ_WHEEL) to block 140 which performs a number of functions including scheduling the gear ratio and ratio changes. Block 140 preferably includes determination of a torque converter slip, and calculation of a desired engine torque based on the final desired wheel torque according to the present invention. Inputs used in these determinations include vehicle speed 122, barometric pressure 126, current gear ratio 142, current torque converter slip 144, and bypass clutch duty cycle 145. Determination of the desired engine torque is explained in greater detail below.

The engine torque requested from block 140 is arbitrated with various other engine torque limiting functions 146 as represented by block 150. Transmission controller 152 may also request torque limiting or modulation to provide cancellation of the inertia phase to improve shift feel. Transmission controller 152 communicates with transmission solenoid control module 154 which energizes the appropriate shift solenoids to effect the ratio change. Solenoid control module 154 preferably dynamically controls the line pressure via transmission pump pressure actuator 42 during a ratio change to improve shift feel. Alternatively, the apply and release pressures for individual clutches or shifting elements may be controlled during the ratio change to further improve shift feel. Transmission controller 152 is also in communication with bypass clutch controller 155 which controls the duty cycle of the torque converter bypass clutch to control the state of the clutch.

The final engine torque determined by block 150 is communicated as a desired engine torque to engine controller 156. The engine controller determines the appropriate air flow, spark, EGR, and fuel as represented by blocks 158, 160, 162, and 164, respectively, to achieve the desired engine torque, such that the wheel torque approaches the desired wheel torque.

While the present invention is described with reference to a desired wheel torque, one of ordinary skill in the art will recognize that the present invention could be easily applied to a system which uses a desired tractive effort or wheel power while providing similar benefits in fuel economy, modularity, and drivability. In particular, the driver request for powertrain output as indicated by accelerator pedal position can be interpreted as a request for wheel power, tractive effort, or engine torque (for manual transmission applications), depending upon the particular application.

Figures 3, 4:
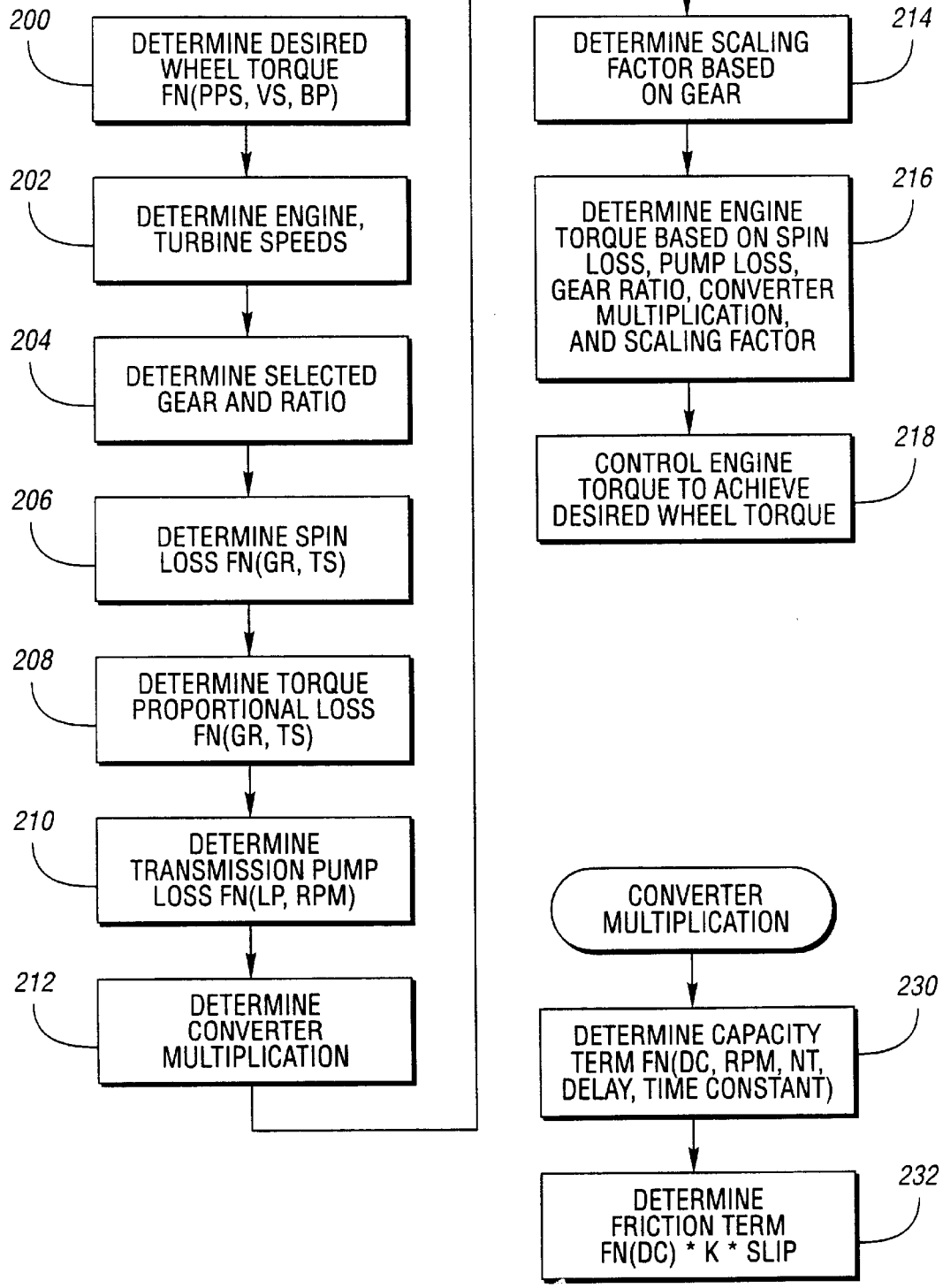
FIG. 3 is a flowchart illustrating control logic for determining a desired engine torque for use in controlling a powertrain according to the present invention.
FIG. 4 is a flowchart illustrating determination of torque converter multiplication using torque converter clutch capacity and friction terms.

Referring now to FIG. 3, a flowchart illustrating control logic of one embodiment of a system or method according to the present invention is shown. As will be appreciated by one of ordinary skill in the art, the flowchart illustrated in FIG. 3 may represent any of a number of known processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages of the invention, but is provided for ease of illustration and description. Preferably, the control logic is implemented in software which is executed by a microprocessor-based controller. Of course, the control logic may be implemented in software, hardware, or a combination of software and hardware. The flowcharts of FIGS. 3–5 illustrate one "loop" and are preferably repeated at predetermined time intervals as known by those of skill in the art.

Block 200 of FIG. 3 represents determination of a desired wheel torque. In a preferred embodiment, wheel torque is determined based on accelerator pedal position, vehicle speed, and barometric pressure. This step may also include determining another output parameter which is then converted or used to determine the desired wheel torque. For example, the desired powertrain output may be based at least in part on the position of an accelerator pedal where the desired powertrain output represents a desired wheel power, tractive effort, engine torque, or the like. Likewise, depending upon the particular application, the powertrain output parameter may be used to determine the desired engine torque with appropriate adjustments to the following steps. Preferably, the desired wheel torque is arbitrated with other wheel torque requests as illustrated and described with reference to FIG. 2.

The current engine speed and turbine speed are determined as represented by block 202. Preferably, the engine speed and turbine speed are determined using appropriate sensors. However, in applications which do not have a sensor to directly detect the engine speed or turbine speed, an estimation or calculation may be performed to determine the speed. For example, in one embodiment of the present invention, turbine speed may be estimated using the engine speed and a torque converter slip calculation.

The torque losses due to the automatic transmission can be separated into a spin loss term and a torque proportional loss. The spin loss is preferably characterized by the particular gear and turbine speed. As used here, turbine speed refers to the input shaft speed of the gearbox or, alternatively, the output speed of the torque converter. The torque proportional loss is essentially a slope which varies as a function of the current gear and turbine speed. As such, the total gearbox loss can be written as:

$$\text{tq\_gb\_loss} = \text{tq\_spin\_loss} + \text{tq\_prop\_loss} = f_1(N_t, \text{gear}) + T_t * f_2(N_t, \text{gear}), \quad (1)$$

where $T_t$ represents the turbine output torque, $N_t$ represents the turbine speed and $f_1$ and $f_2$ are functions represented by values which are preferably stored in corresponding lookup tables.

The gearbox losses may be determined according to:

$$\text{tq\_gb\_loss} = \text{fn\_spinx}(N_t) + T_t * \text{fn\_tq\_px}(N_t) \quad (2)$$

where x represents the current gear. Thus, in a preferred embodiment of the present invention, a transmission spin loss is based on a first function of turbine speed and the currently selected gear while the torque proportional loss is based on a second function of the turbine speed and the currently selected gear.

Preferably, the spin loss and torque proportional loss are adjusted for variations in transmission oil temperature (TOT) because the losses due to cold TOT may be significant. This may be accomplished by incorporating TOT into the lookup table values, or by including a separate lookup table with a scaling factor.

With continuing reference to FIG. 3, the currently selected gear and associated gear ratio are determined as represented by block 204. The value for the current gear, or alternatively the current gear ratio, is used along with the turbine speed (estimated or actual) to determine a transmission spin loss as represented by block 206. Preferably, the spin loss values are stored in a lookup table which corresponds to the current gear and is accessed or indexed by the turbine speed as described above. Determination of the torque proportional loss is represented by block 208 of FIG. 3. These values are also preferably stored in a lookup table with a separate set of values for each of the available gears or gear ratios. The lookup table corresponding to the current gear or gear ratio is preferably accessed or indexed by turbine speed, or an equivalent value.

Because the transmission oil pump is directly driven by the impeller, the torque loss due to the transmission oil pump may be described as a function of engine speed and transmission line pressure (LP). A value representing the transmission pump loss is determined as represented by block 210. Again, the values for transmission pump loss are preferably stored in a lookup table, which, for transmission oil pump losses, is indexed by engine speed and line pressure.

With continuing reference to FIG. 3, a torque converter multiplication factor is determined as represented by block 212. When the torque converter is operated with the torque converter clutch in its unlocked state, the torque converter multiplies or increases the engine torque delivered to the input of the transmission gearbox. Preferably, the converter multiplication is determined based on the speed ratio (turbine speed/engine speed). Again, the multiplication factors or values are preferably stored in a lookup table which, in this case, is indexed by the speed ratio. A more complex determination which incorporates terms for the torque converter clutch (bypass clutch) is illustrated and described with reference to FIG. 4.

Block 214 of FIG. 3 represents determination of a scaling factor based on the currently selected gear. This factor may be used to fine-tune or calibrate the engine torque determination for any additional losses which may not be included in the torque loss terms described above. The engine torque is then determined based on the transmission spin loss, torque proportional loss, pump loss, gear ratio, final drive ratio, converter multiplication, and scaling factor as represented by block 216. In a preferred embodiment, engine torque is determined according to:

$$T_e = \left[ \text{fn\_pump\_loss}(N_e, P_1) + \frac{T_w + GRRAT * FDR * \text{fn\_spinx}(N_t)}{GRRAT * FDR * fn(N_t/N_e) * (1 - \text{fn\_tq\_px}(N_t))} \right] * \text{tq\_mult\_x}$$

where $T_e$ represents the desired engine torque, $N_e$ represents engine speed, $P_l$ represents line pressure, $T_w$ represents the desired wheel torque, GRRAT represents the currently selected gear ratio, and FDR represents the final drive ratio or differential ratio, which may or may not account for efficiency of the differential. In addition, fn_spinx represents the transmission spin loss, fn_tq_px represents the torque proportional loss, $N_t$ represents the turbine speed, and tq_mult_x represents the scaling factor where x in each of the functions represents a particular lookup table for the currently selected gear.

The engine torque determined by block 216 is then used to control the powertrain such that the wheel torque approaches the desired wheel torque. A alternative embodiment for determining engine torque using a power calculation and a ratio calculation is illustrated and described with reference to FIG. 5.

Referring now to FIG. 4, a flowchart illustrating an alternative method for determining the torque converter multiplication represented by block 212 of FIG. 3 is shown. This approach incorporates a more sophisticated model which includes a capacity term and a friction term to represent losses associated with the torque converter clutch during partial engagement. A torque converter clutch capacity term is determined as represented by block 230. Preferably, the capacity term is a function of the torque converter clutch solenoid duty cycle, engine speed (RPM), turbine speed ($N_T$), a time delay corresponding to the prestroke delay of the hydraulic and mechanical converter system, and a time constant representing the response time of the hydraulic system.

A friction term is then determined as represented by block 232. The friction term is a function of the converter clutch solenoid duty cycle, a proportionality constant (K), and the converter slip, i.e. the difference between engine speed and turbine speed. The adjusted or compensated torque converter multiplication is then preferably determined according to:

$$T_e = \max(0, T_t - T_{clutch})/\text{fn}(N_t/N_e) + \min(T_{clutch}, T_t) + \text{friction} \quad (4)$$

where min represents a function which selects the minimum or lowest value of the parenthetical terms and max is a function which selects the maximum of the parenthetical terms.

An alternative strategy for determining the desired engine torque according to the present invention is illustrated in FIG. 5. This strategy uses either a power calculation or a gear ratio calculation to determine the desired engine torque, depending upon the current vehicle speed. Because the power calculation includes a term representing the wheel speed (WS), it would provide a zero solution when the vehicle is stationary. As such, the power calculation provides a useful result only when the vehicle speed exceeds a corresponding threshold as represented by block 240. The power calculation, represented by block 242, determines engine torque as a function of wheel speed, wheel torque, engine speed (RPM), and turbine speed (TS). In a preferred embodiment, a desired engine torque is determined according to:

$$T_e = [T_w * N_{wheel}]/[\text{fn}(N_t/N_e) * N_t], \quad (5)$$

where $T_e$ represents the engine torque, $T_w$ represents the wheel torque, $N_{wheel}$ represents the wheel speed, and $N_t$ represents the turbine speed.

When vehicle speed does not exceed the threshold as determined by block 240, then a gear ratio-based calculation is used as represented by block 244. The ratio calculation determines engine torque as a function of wheel torque, gear ratio, engine speed, and turbine speed. In a preferred embodiment, the engine torque is determined according to:

$$T_e = T_w/[GRRAT * FDR * \text{fn}(N_t/N_e)] \quad (6)$$

where $T_e$ represents the desired engine torque, $T_w$ represents the desired wheel torque, GRRAT represents the gear ratio, FDR represents the final drive ratio, $N_t$ represents the turbine speed, and $N_e$ represents the engine speed. This is essentially a simplified form of equation (3), which could also be used, if desired. However, for low speed calculations, the simplified form is sufficient for many applications.

For applications which do not use a turbine speed sensor to determine the turbine speed, the power calculation and ratio calculation may be modified to determine the engine torque using the torque converter slip. Preferably, the calculation of engine torque using the power calculation is determined according to equation 5 above. Substitution of torque converter slip (Nt=Ne-slip) into the above calculation results in:

$$T_e = [T_w * N_{wheel}] / [\text{fn}((N_e - \text{SLIP})/N_e) * (N_e - \text{SLIP})] \quad (7)$$

Figure 7:
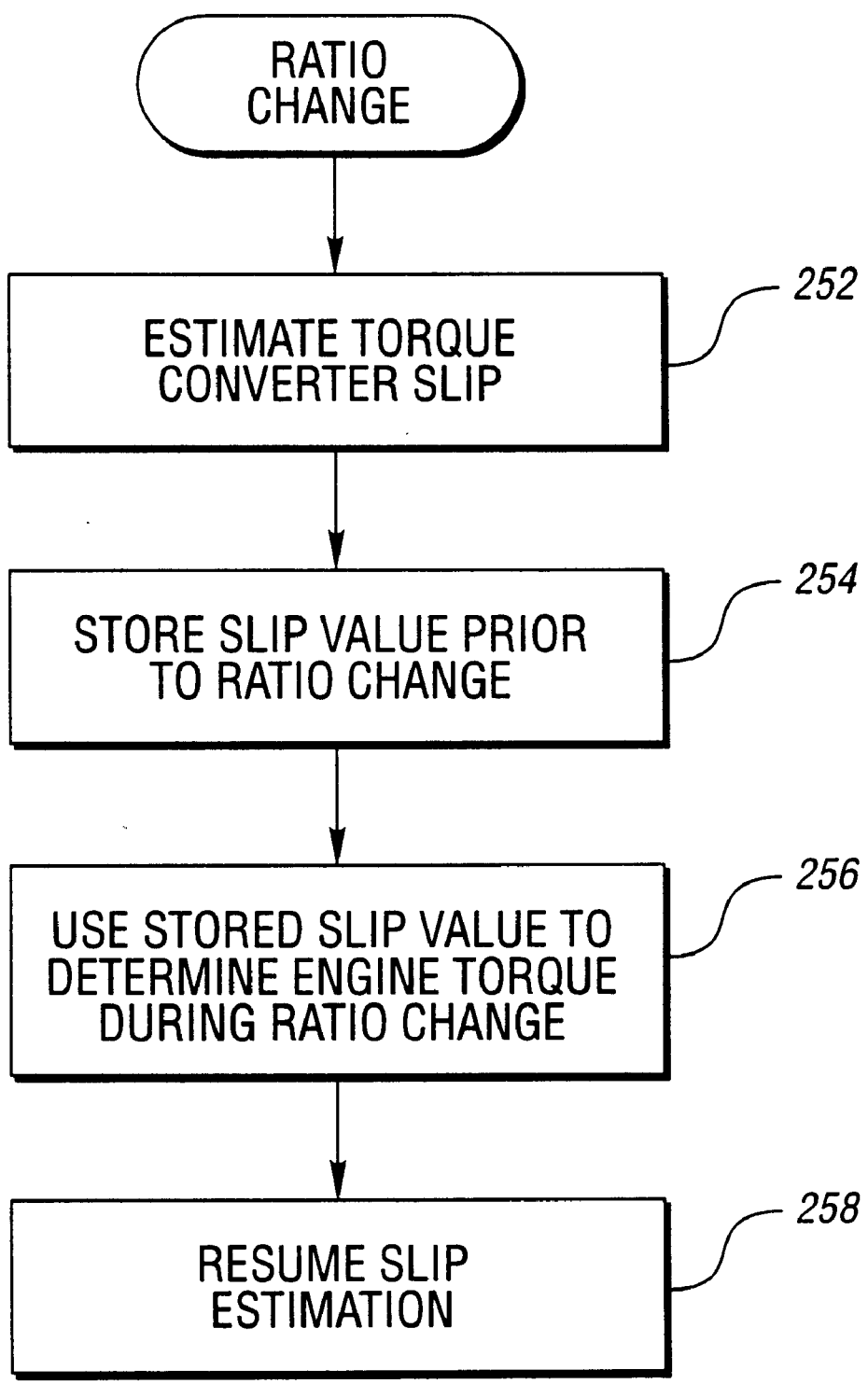
FIG. 7 is a flowchart illustrating alternative control logic for determining a desired engine torque during a ratio change according to the present invention.

FIGS. 6 and 7 are flowcharts representing alternative methods for determining the desired engine torque during a ratio change according to the present invention. Either strategy may be used with one or both of the alternative strategies for determining engine torque described above. The first strategy, illustrated in FIG. 6, calculates the desired engine torque for the currently selected gear as represented by block 246. A second engine'torque is calculated based on the target gear as represented by block 248. The resulting desired engine torque is then determined based on an interpolation between the first and second engine torque values calculated by blocks 246 and 248 as represented by block 250. Turbine speed is used to interpolate between the two values for engine torque by comparing the actual or estimated turbine speed to the expected turbine speed for the current and target gears or gear ratios. This strategy may be preferred for some applications in that it accommodates integration of relatively complex expressions for engine torque, it is not susceptible to delays in gear ratio, and the same expression may be used to calculate the engine torque over the entire vehicle speed range.

An alternative method for calculating the engine torque during a ratio change is illustrated in FIG. 7. This alternative, or second strategy is particularly useful for applications where the turbine speed or slip cannot be accurately determined during a ratio change or gear shift. This strategy is based on a sample-and-hold technique. Upon initiation of a ratio change, the value for the torque converter slip or turbine speed is determined as represented by block 252. This value is stored or held constant for a predetermined period of time as represented by block 254. After the time expires, the slip or turbine speed is again measured or calculated to determine the "actual" value as represented by block 258. The sudden change between the engine torque calculated using the held value and the engine torque calculated using the actual value which occurs upon expiration of the predetermined time can be used to improve shift quality, if appropriately synchronized with the ratio change, i.e., synchronized with the inertia phase to request an engine torque reduction which cancels the inertia of the shift.

FIG. 8 provides representative values for transmission oil pump losses for use in determination of a desired engine torque according to the present invention. The graph of FIG. 8 plots torque loss as a function of transmission pump speed for a representative operating oil temperature of 200° F. Line 260 represents a line pressure of 200 psi with a torque loss value ranging between about 3 and 7 ft.-lbs. Lines 262, 264, and 266 represent the associated losses for line pressures corresponding to 150, 100, and 60 psi, respectively. These values are preferably stored in a lookup table which is referenced by pump or engine speed, and may also be referenced by, or adjusted by, transmission oil temperature (TOT).

Figure 9:
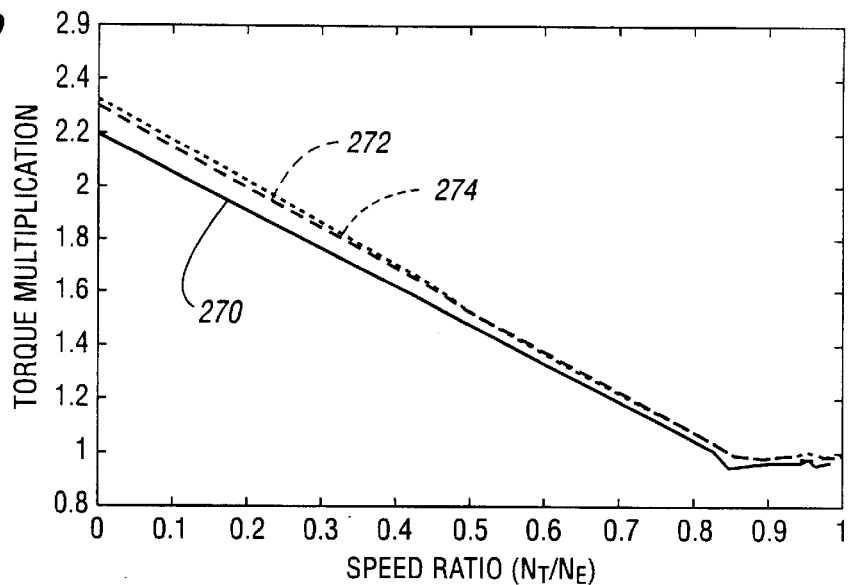
FIG. 9 is a graph illustrating representative values for torque converter multiplication based on speed ratio for used in determining a desired engine torque according to the present invention.

FIG. 9 illustrates representative values for the torque converter multiplication factor used in determining desired engine torque according to the present invention. Preferably, the values are stored in a look-up table which is indexed or referenced by the speed ratio. Line 270 represents the torque converter multiplication factors for an input torque of about 35 ft.-lbs. Lines 272 and 274 represent the torque converter multiplication factors for input torques of about 100 and 200 ft.-lbs., respectively.

Figure 10:
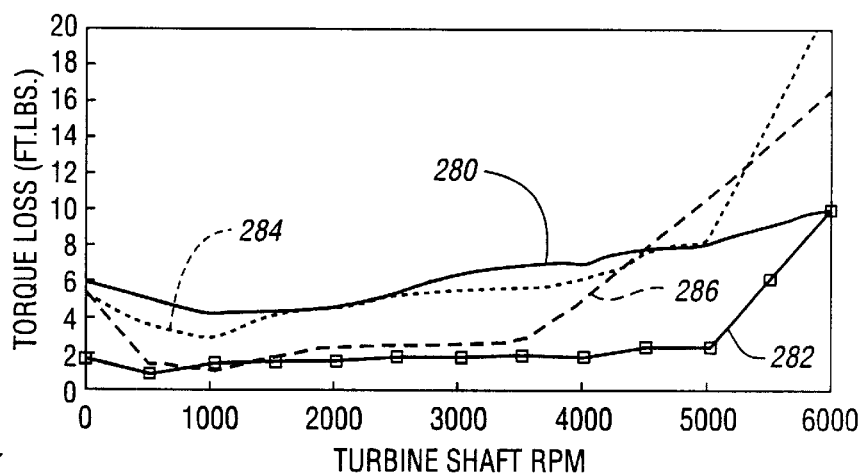
FIG. 10 is a graph illustrating representative values of transmission spin loss for use in determining a requested engine torque according to the present invention.

FIG. 10 illustrates representative values for transmission spin losses used in determining a desired engine torque according to the present invention. Preferably, the transmission spin loss values are stored in lookup tables associated with each of the available gears or gear ratios. The graph of FIG. 10 plots torque loss (ft.-lbs.) as a function of turbine shaft speed. Line 280 represents the spin loss values for first gear in a representative application. Line 282 represents the transmission spin loss values for second gear, while lines 284 and 286 represent the transmission spin losses for third gear and fourth gear, respectively.

Figure 11:
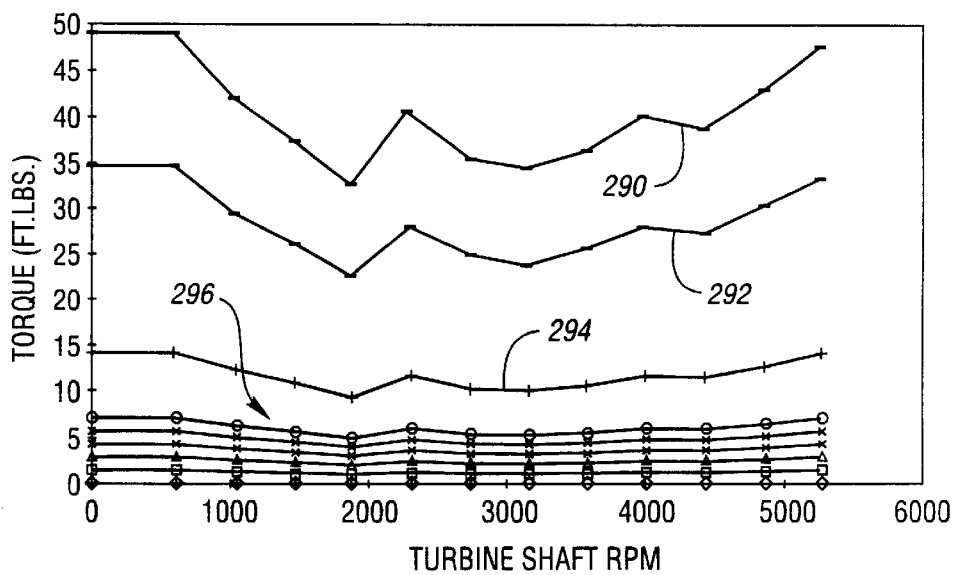
FIG. 11 is a graph illustrating representative values of transmission torque proportional losses for use in determining desired engine torque according to the present invention.

Representative values for torque proportional losses used in determining a desired engine torque according to the present invention are shown in FIG. 11. The graph of FIG. 11 plots torque loss (ft.-lbs.) as a function of turbine shaft RPM for various torques. Lines 290, 292, and 294 represent the torque proportional losses for input torques corresponding to 718, 500, and 200, respectively. The remaining lines, represented generally by reference numeral 296, correspond to torque proportional losses for torques of 100-0 ft.-lbs.

FIGS. 12A–12D illustrate the operation of torque modulation during a ratio change to improve shift feel. Preferably, torque modulation is accomplished using a spark retard during the inertia phase of the shift. The spark retard may be determined using a torque ratio calculation based on the desired engine torque determined according to one of the strategies described above. In a preferred embodiment, the torque ratio is determined according to:

$$\text{tq\_ratio} = T_e / [T_e - dNdtI * I_e] \quad (8)$$

where $T_e$ represents the desired steady state engine torque (not accounting for engine inertia torque), dNdtI represents the time derivative of engine speed, and $I_e$ represents engine inertia. The corresponding spark retard is preferably calculated according to:

$$\text{delta\_spk} = G * \text{fn}(\text{tq\_ratio}) \quad (9)$$

where G is a calibratable gain used to tune performance.

Line 310 of FIG. 12a represents the desired wheel torque as a function of time. Line 312 of FIG. 12a represents the actual wheel torque. FIG. 12b illustrates the engine RPM on the same time scale. FIG. 12c illustrates the time derivative of the engine RPM as represented by line 330. FIG. 12d illustrates the spark retard calculated in accordance with equation (10) based on the desired engine torque determined according to the present invention. As illustrated in FIG. 12a, the torque modulation using the desired engine torque has been effective to substantially reduce or eliminate the inertia torque during the 1–2 shift.

While the best mode for carrying out the invention has been described in detail, those familiar with the art to which this invention relates will recognize various alternative designs and embodiments for practicing the invention as defined by the following claims.

What is claimed is:

1. A method for controlling a powertrain including an internal combustion engine and an automatic transmission having a plurality of selectable gears with associated gear ratios, the automatic transmission being coupled to the internal combustion engine via a torque converter having a turbine, the method comprising:
   determining a desired wheel torque;
   determining engine speed;

determining turbine speed;

determining a selected gear and associated selected gear ratio;

determining a transmission spin loss based on a first function of the turbine speed and the selected gear;

determining a transmission torque proportional loss based on turbine torque and a second function of the turbine speed and the selected gear;

determining a desired engine torque based on the transmission spin loss, the transmission torque proportional loss, and the selected gear ratio; and controlling the powertrain using the desired engine torque such that actual wheel torque approaches the desired wheel torque.

2. The method of claim 1 further comprising:

determining a transmission pump loss based on the engine speed and a requested transmission hydraulic line pressure; and wherein the step of determining a desired engine torque includes determining the desired engine torque based at least in part on the transmission pump loss.

3. The method of claim 1 wherein the step of determining a desired wheel torque comprises:

determining a desired powertrain output based at least in part on position of an accelerator pedal; and converting the desired powertrain output to the desired wheel torque.

4. The method of claim 3 wherein the step of determining a desired powertrain output comprises determining a desired tractive effort.

5. The method of claim 3 wherein the step of determining a desired powertrain output comprises determining a desired wheel power.

6. The method of claim 1 wherein the step of determining turbine speed comprises estimating turbine speed based on engine speed and an estimate of torque converter slip.

7. The method of claim 1 further comprising:

determining a torque converter multiplication based on the turbine speed and the engine speed; and wherein the step of determining a desired engine torque includes determining a desired engine torque based at least in part on the converter multiplication.

8. The method of claim 7 wherein the step of determining a torque converter multiplication comprises:

determining a friction term based on a torque converter clutch solenoid duty cycle, a proportionality constant, engine speed, and turbine speed;

determining a torque converter clutch capacity term based on the torque converter clutch solenoid duty cycle, engine speed, turbine speed, a time constant for the transmission hydraulic system, and a time delay between a converter clutch command and actuation of the converter clutch; and adjusting the torque converter multiplication based on the friction term and the capacity term.

9. The method of claim 1 wherein the step of determining a desired engine torque further comprises:

determining a scaling factor based on the selected gear; and multiplying the desired engine torque by the scaling factor prior to controlling the powertrain output based on-the desired engine torque.

10. The method of claim 1 wherein a ratio change from the selected gear to a target gear having an associated target gear ratio has been commanded and wherein the step of determining the desired engine torque comprises:

determining a first engine torque based on the selected gear, the selected gear ratio, the torque proportional loss, and the transmission spin loss;

determining a second torque proportional loss based on the target gear and a second turbine speed wherein the second turbine speed is based on the target gear ratio and output shaft speed;

determining a second transmission spin loss based on the target gear and the second turbine speed;

determining a second engine torque based on the second torque proportional loss, the second spin loss and the target gear ratio; and determining the desired engine torque based on the first and second engine torques.

11. The method of claim 10 wherein the step of determining the desired engine torque comprises interpolating between the first and second engine torques.

12. The method of claim 1 wherein a ratio change from the selected gear to a target gear having an associated target gear ratio has been commanded, the method further comprising:

estimating a torque converter slip; and storing the torque converter slip when the gear ratio has been commanded;

wherein the step of determining the desired engine torque includes determining the desired engine torque based on the stored torque converter slip for a predetermined time after the ratio change has been commanded.

13. The method of claim 1 wherein a ratio change from the selected gear to a target gear having an associated target gear ratio has been commanded, the method further comprising:

determining a torque ratio based on engine speed and engine inertia; and adjusting spark based on the torque ratio for a predetermined time after the ratio change has been commanded to reduce actual engine torque during the ratio change.

14. A method for controlling a powertrain including an internal combustion engine and an automatic transmission having a plurality of selectable gears with associated gear ratios, the method comprising:

determining a desired wheel torque;

determining engine speed;

determining turbine speed;

determining a selected gear and associated selected gear ratio;

determining current vehicle speed;

determining desired engine torque based on wheel speed, the desired wheel torque, the engine speed, and the turbine speed when vehicle speed exceeds a corresponding threshold; and determining the desired engine torque based on the desired wheel torque, the selected gear ratio, the engine speed, and the turbine speed when the vehicle speed does not exceed the corresponding threshold.

15. The method of claim 14 wherein the step of determining turbine speed comprises estimating turbine speed based on engine speed and an estimate of torque converter slip.

16. The method of claim 15 further comprising:

determining a value for torque converter slip upon initiation of a ratio change; and maintaining the value for a predetermined time during the ratio change.

17. The method of claim 14 wherein a ratio change from the selected gear to a target gear having an associated target gear ratio has been commanded, the method further comprising:
   determining a torque ratio based on engine speed and engine inertia; and
   adjusting spark based on the torque ratio for a predetermined time after the ratio change has been commanded to reduce actual engine torque during the ratio change.

18. A computer readable storage medium having stored data representing instructions executable by a computer to control a powertrain having an internal combustion engine and an automatic transmission, the computer readable storage medium comprising:
   instructions for determining a desired wheel torque;
   instructions for determining engine speed;
   instructions for determining turbine speed;
   instructions for determining a selected gear and associated selected gear ratio;
   instructions for determining a transmission spin loss based on a first function of the turbine speed and the selected gear;
   instructions for determining a transmission torque proportional loss based on turbine torque and a second function of the turbine speed and the selected gear;
   instructions for determining a desired engine torque based on the transmission spin loss, the transmission torque proportional loss, and the selected gear ratio; and
   instructions for controlling the powertrain using the desired engine torque such that actual wheel torque approaches the desired wheel torque.

19. The computer readable storage medium of claim 18 wherein the instructions for determining turbine speed include instructions for estimating turbine speed based on engine speed and an estimated torque converter slip.

20. The computer readable storage medium of claim 18 further comprising:
   instructions for determining a transmission pump loss based on the engine speed and a requested transmission hydraulic line pressure; and
   wherein the instructions for determining a desired engine torque include instructions for determining the desired engine torque based at least in part on the transmission pump loss.

21. The computer readable storage medium of claim 18 wherein the instructions for determining a desired engine torque during a ratio change comprise:
   instructions for determining a first engine torque based on the selected gear, the selected gear ratio, the torque proportional loss, and the transmission spin loss;
   instructions for determining a second torque proportional loss based on a target gear and a second turbine speed wherein the second turbine speed is based on a target gear ratio and output shaft speed;
   instructions for determining a second transmission spin loss based on the target gear and the second turbine speed;
   instructions for determining a second engine torque based on the second torque proportional loss, the second spin loss and the target gear ratio; and
   instructions for determining the desired engine torque based on the first and second engine torques.

22. The computer readable storage medium of claim 18 further comprising:
   instructions for determining a torque ratio based on engine speed and engine inertia during a ratio change; and
   instructions for adjusting spark based on the torque ratio for a predetermined time after the ratio change has been commanded to reduce actual engine torque during the ratio change.

23. A computer readable storage medium having stored data representing instructions executable by a computer to control a powertrain having an internal combustion engine and an automatic transmission, the computer readable storage medium comprising:
   instructions for determining a desired wheel torque;
   instructions for determining engine speed;
   instructions for determining turbine speed;
   instructions for determining a selected gear and associated selected gear ratio;
   instructions for determining a transmission spin loss based on a first function of the turbine speed and the selected gear;
   instructions for determining a transmission torque proportional loss based on turbine torque and a second function of the turbine speed and the selected gear;
   instructions for determining desired engine torque based on the transmission spin loss, the transmission torque proportional loss, the selected gear ratio, the desired wheel torque, wheel speed, engine speed, and torque converter slip when vehicle speed exceeds a corresponding threshold;
   instructions for determining the desired engine torque based on the transmission spin loss, the transmission torque proportional loss, the selected gear ratio, the desired wheel torque, the selected gear ratio, engine speed, and the torque converter slip when the vehicle speed does not exceed the corresponding threshold; and
   instructions for controlling the powertrain using the desired engine torque such that actual wheel torque approaches the desired wheel torque.

24. A computer readable storage medium having stored data representing instructions executable by a computer to control a powertrain having an internal combustion engine and an automatic transmission, the computer readable storage medium comprising:
   instructions for determining a desired wheel torque;
   instructions for determining engine speed;
   instructions for determining turbine speed;
   instructions for determining a selected gear and associated selected gear ratio;
   instructions for determining a transmission spin loss based on a first function of the turbine speed and the selected gear;
   instructions for determining a transmission torque proportional loss based on turbine torque and a second function of the turbine speed and the selected gear;
   instructions for determining desired engine torque based on the transmission spin loss, the transmission torque proportional loss, the selected gear ratio, wheel speed, the desired wheel torque, the engine speed, and the turbine speed when vehicle speed exceeds a corresponding threshold;
   instructions for determining the desired engine torque based on the transmission spin loss, the transmission torque proportional loss, the selected gear ratio, the desired wheel torque, the selected gear ratio, the engine speed, and the turbine speed when the vehicle speed does not exceed the corresponding threshold; and
   instructions for controlling the powertrain using the desired engine torque such that actual wheel torque approaches the desired wheel torque.

* * * * *